United States Patent [19]

Tanimoto et al.

[11] Patent Number: 5,448,278
[45] Date of Patent: Sep. 5, 1995

[54] IMAGE FORMING APPARATUS USING VARIABLE LIGHT BEAM

[75] Inventors: Koji Tanimoto, Kawasaki; Kouichi Watanabe, Warabi, both of Japan

[73] Assignee: Kabushiki Kaisha Toshiba, Kawasaki, Japan

[21] Appl. No.: 832,908

[22] Filed: Feb. 7, 1992

[30] Foreign Application Priority Data

May 31, 1991 [JP] Japan .................................. 3-129526

[51] Int. Cl.6 ...................... G01D 9/42; G01D 15/14
[52] U.S. Cl. .................................... 347/129; 347/131; 347/233; 347/240
[58] Field of Search ............... 346/108, 160; 358/298; 347/129, 131, 233, 240

[56] References Cited

U.S. PATENT DOCUMENTS

| | | | |
|---|---|---|---|
| 4,626,923 | 12/1986 | Yoshida | 353/283 |
| 4,809,021 | 2/1989 | Check et al. | 346/108 |
| 5,006,704 | 4/1991 | Mochizuki et al. | 346/108 |
| 5,075,780 | 12/1991 | Shibahara | 358/298 |
| 5,105,280 | 4/1992 | Ogino et al. | 358/298 |
| 5,128,699 | 7/1992 | Nakajima et al. | 346/160 |
| 5,144,338 | 9/1992 | Sakano | 346/108 |
| 5,187,495 | 2/1993 | Tanimoto et al. | 346/108 |
| 5,210,545 | 5/1993 | Tomita | 346/108 X |
| 5,241,329 | 8/1993 | Guerin | 346/108 |

OTHER PUBLICATIONS

"31st Meeting of Society of Electrophotography" pp. 128 and 142 to 144, Jul. 18, 1991.

Primary Examiner—Benjamin R. Fuller
Assistant Examiner—Randy W. Gibson
Attorney, Agent, or Firm—Foley & Lardner

[57] ABSTRACT

This invention modifies printing information from a laser scanner to improve the appearance of printed matter. This improvement takes into account the image data of a target pixel to be printed and the image data of adjacent pixels located before and after the target pixel, the pulse position of the target pixel. An operator can select whether to shift the radiation timing of a laser beam to the left or the right within one pixel, and whether to squeeze the laser beam to reduce its beam size or broaden it to increase its beam size.

8 Claims, 17 Drawing Sheets

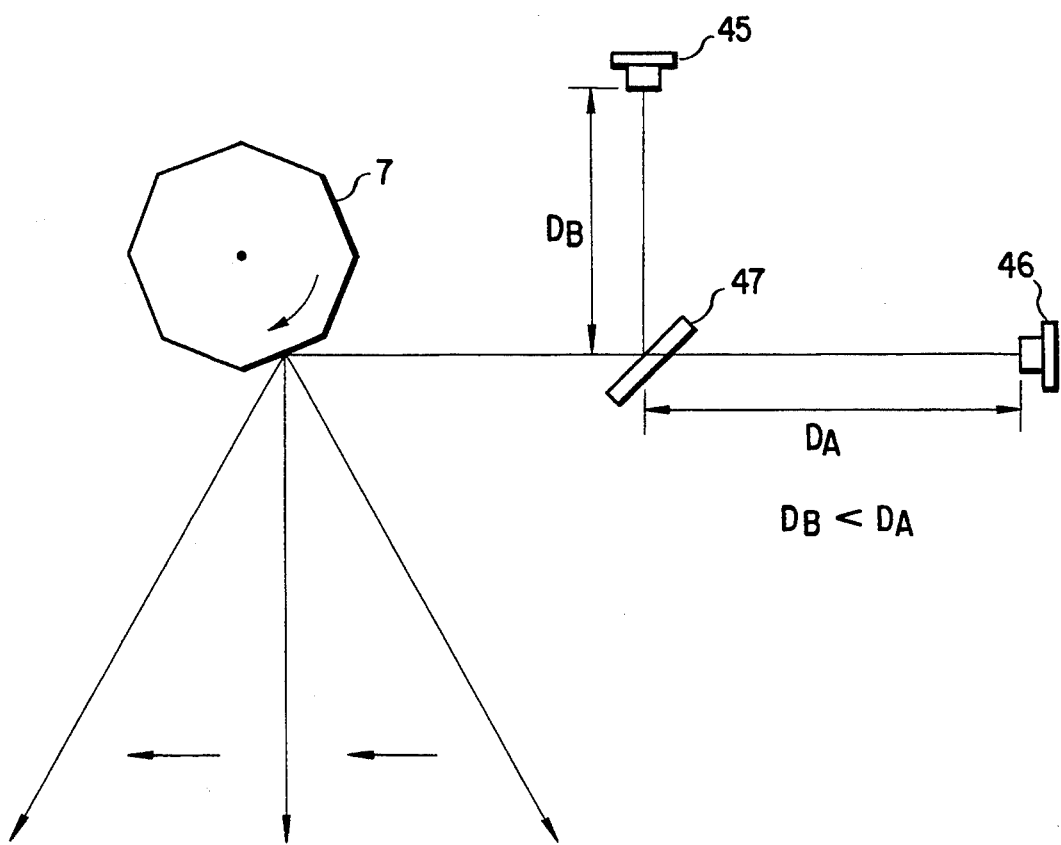
F I G. 3

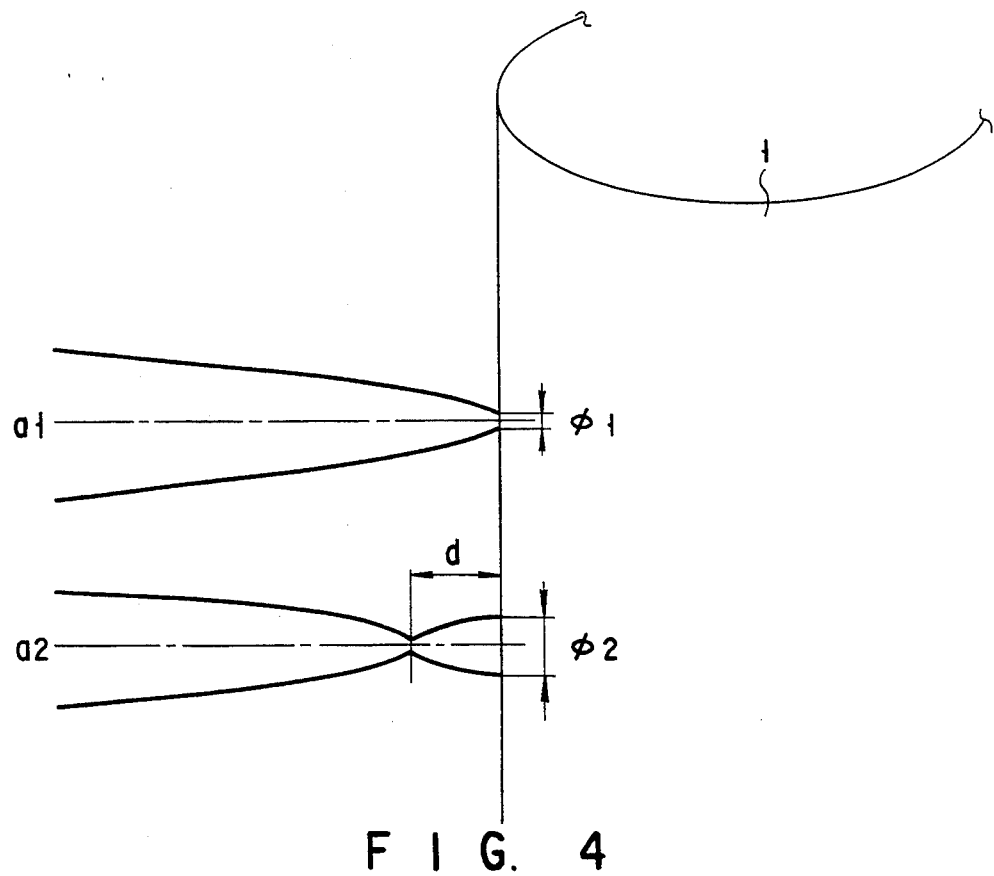
F I G. 4
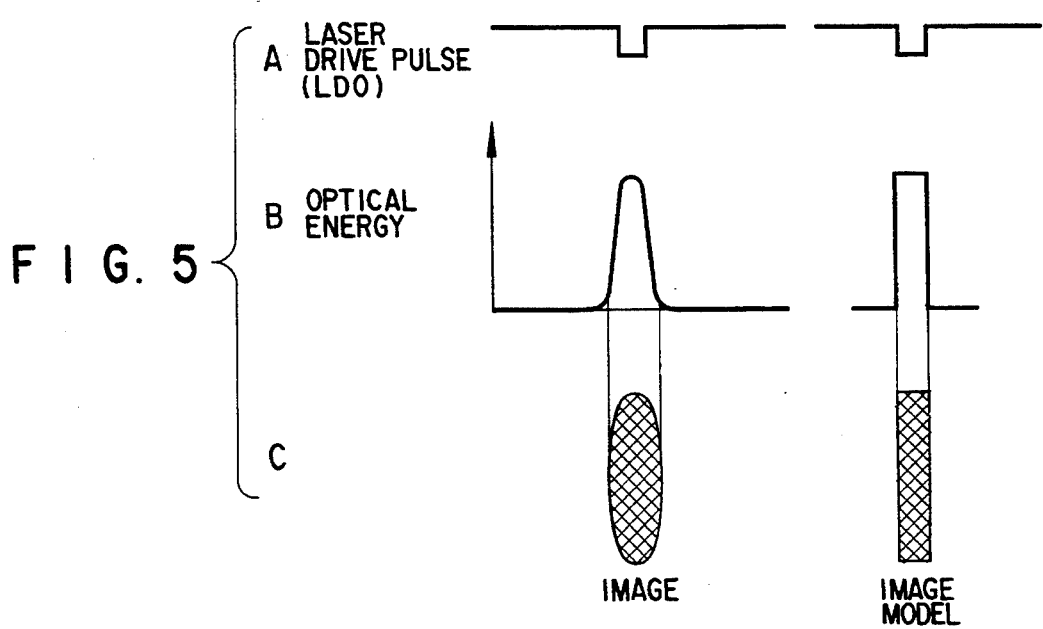
F I G. 5

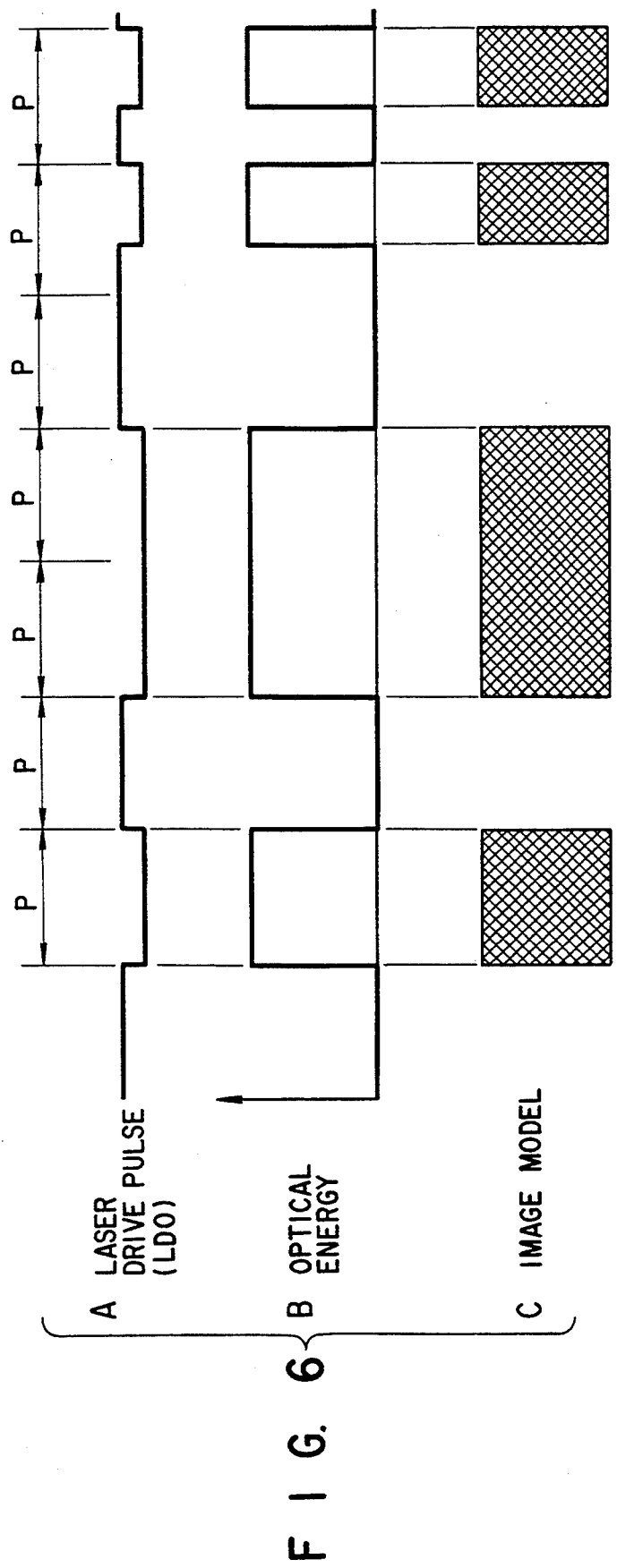
F I G. 6

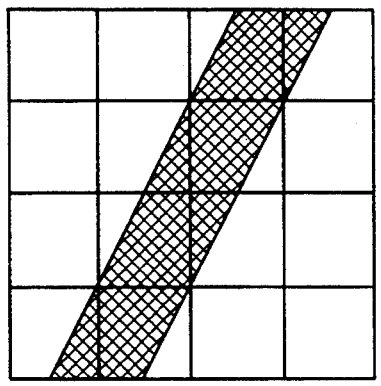
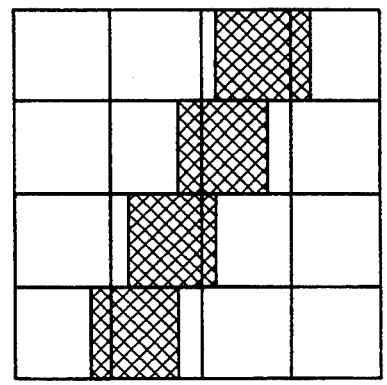
F I G. 7A  F I G. 7B
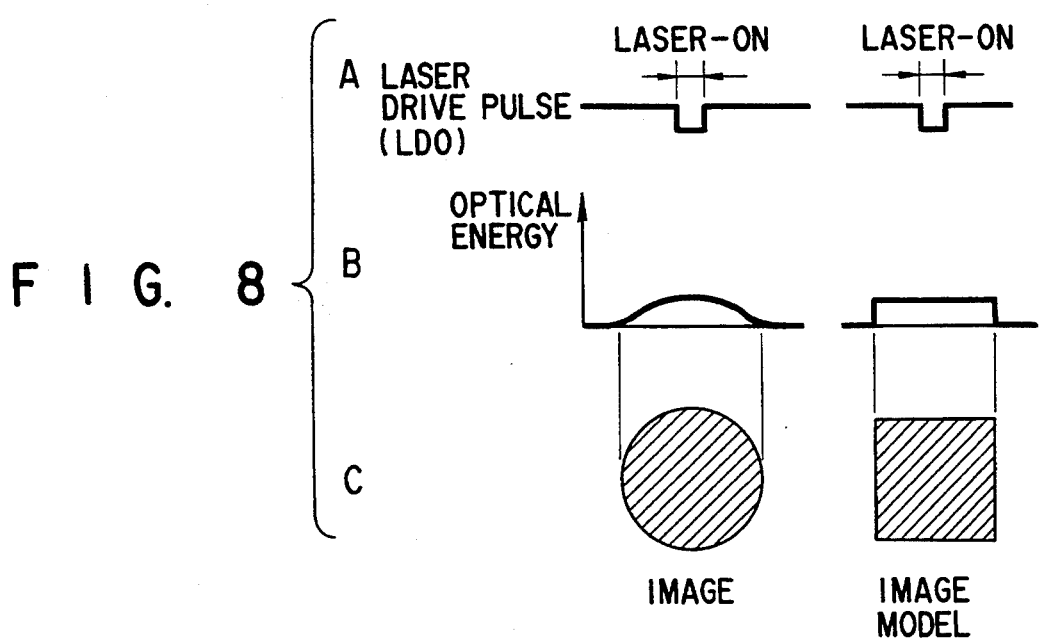
F I G. 8

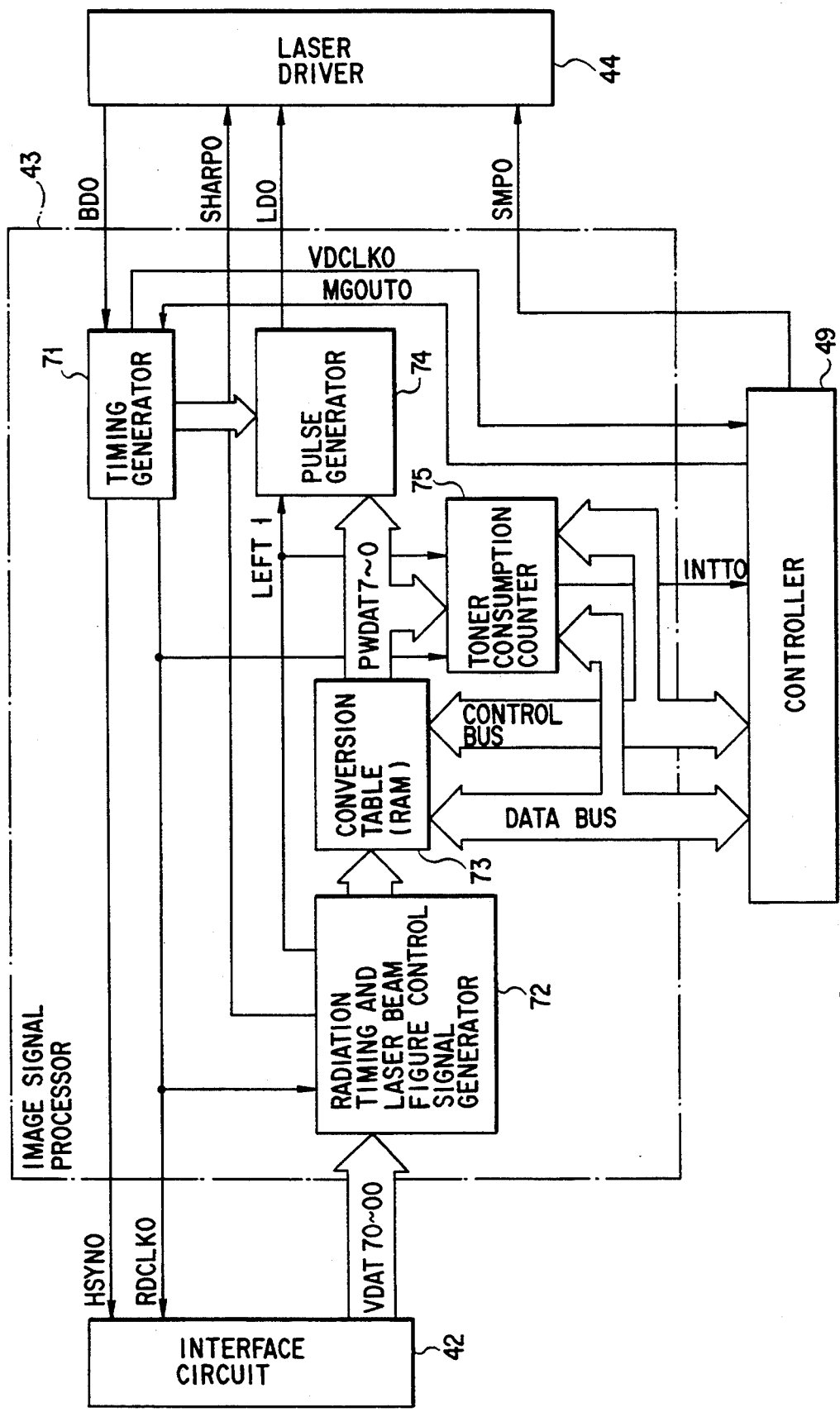
F I G. 10

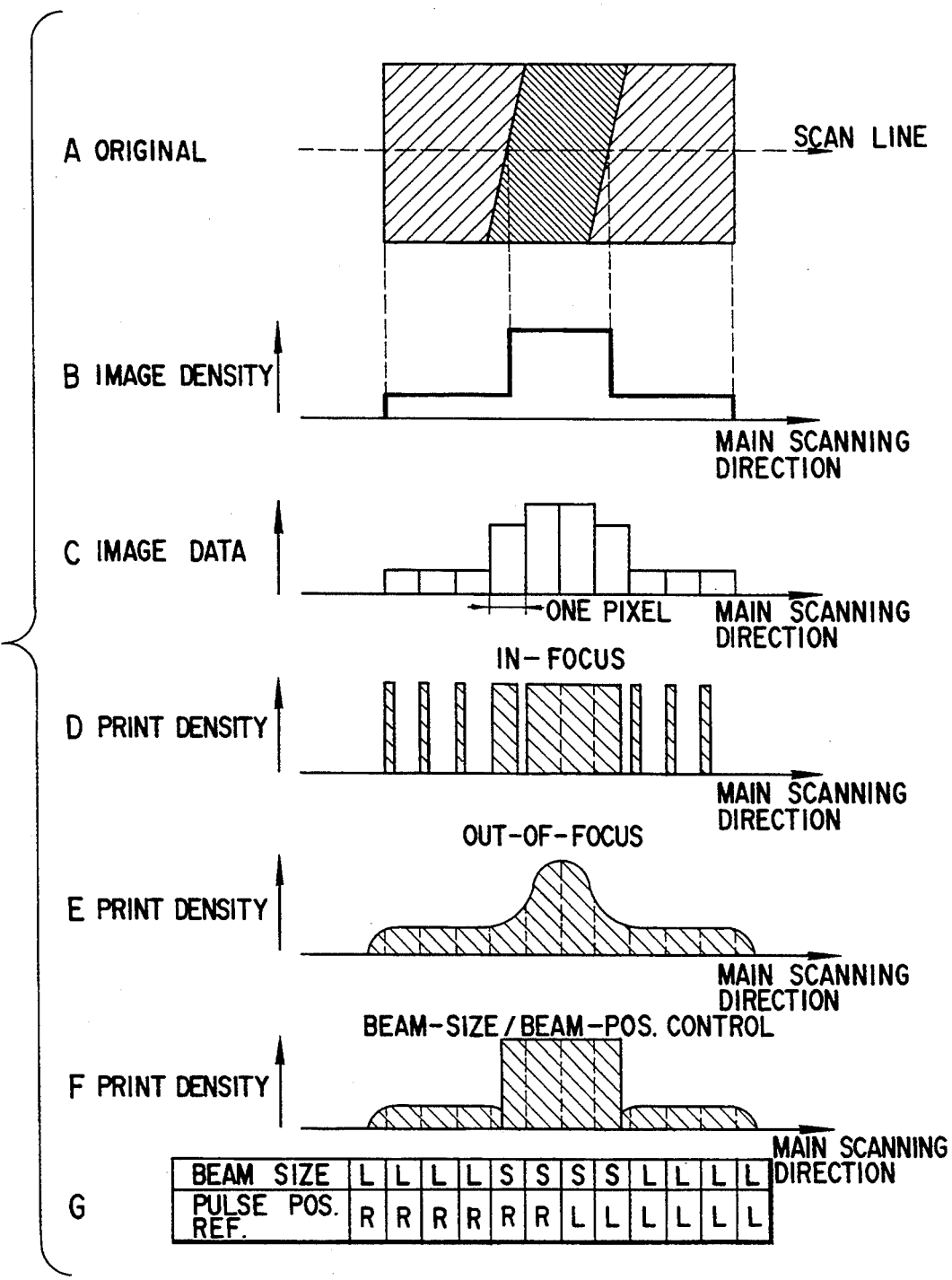
F I G. 13

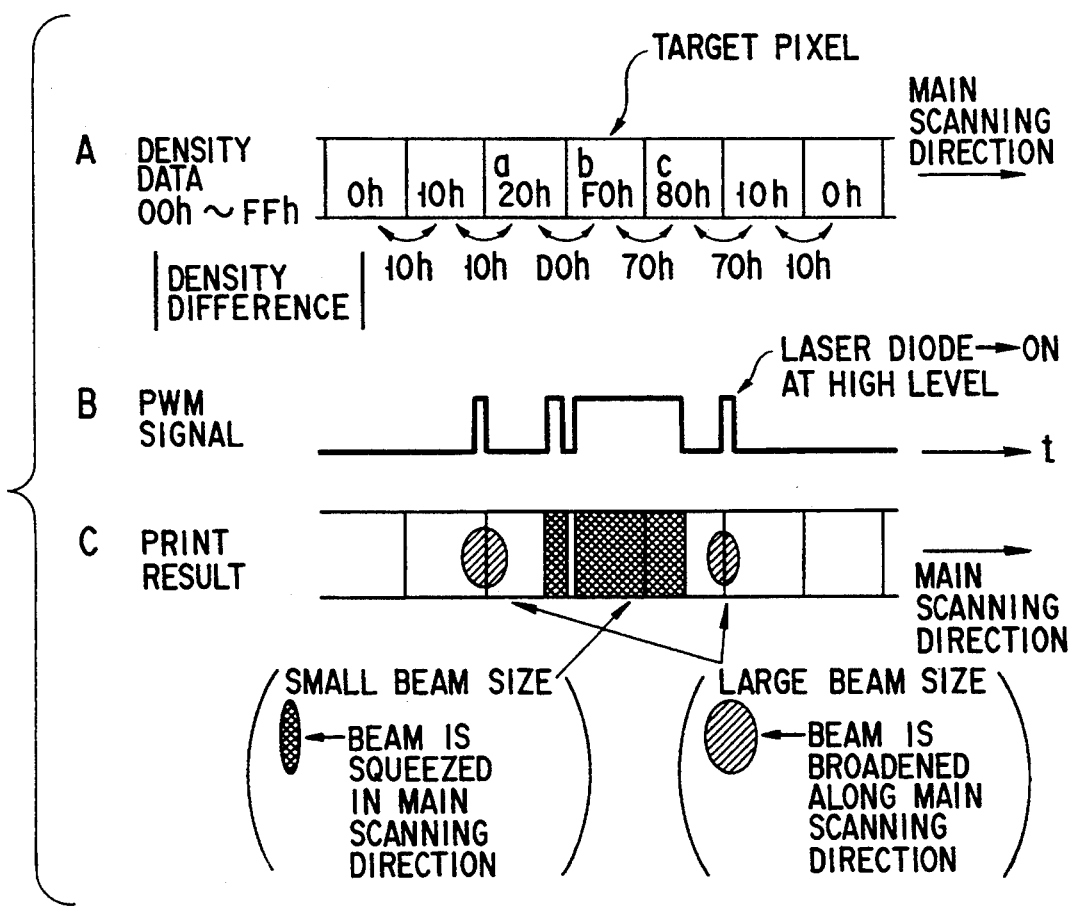
F I G. 16

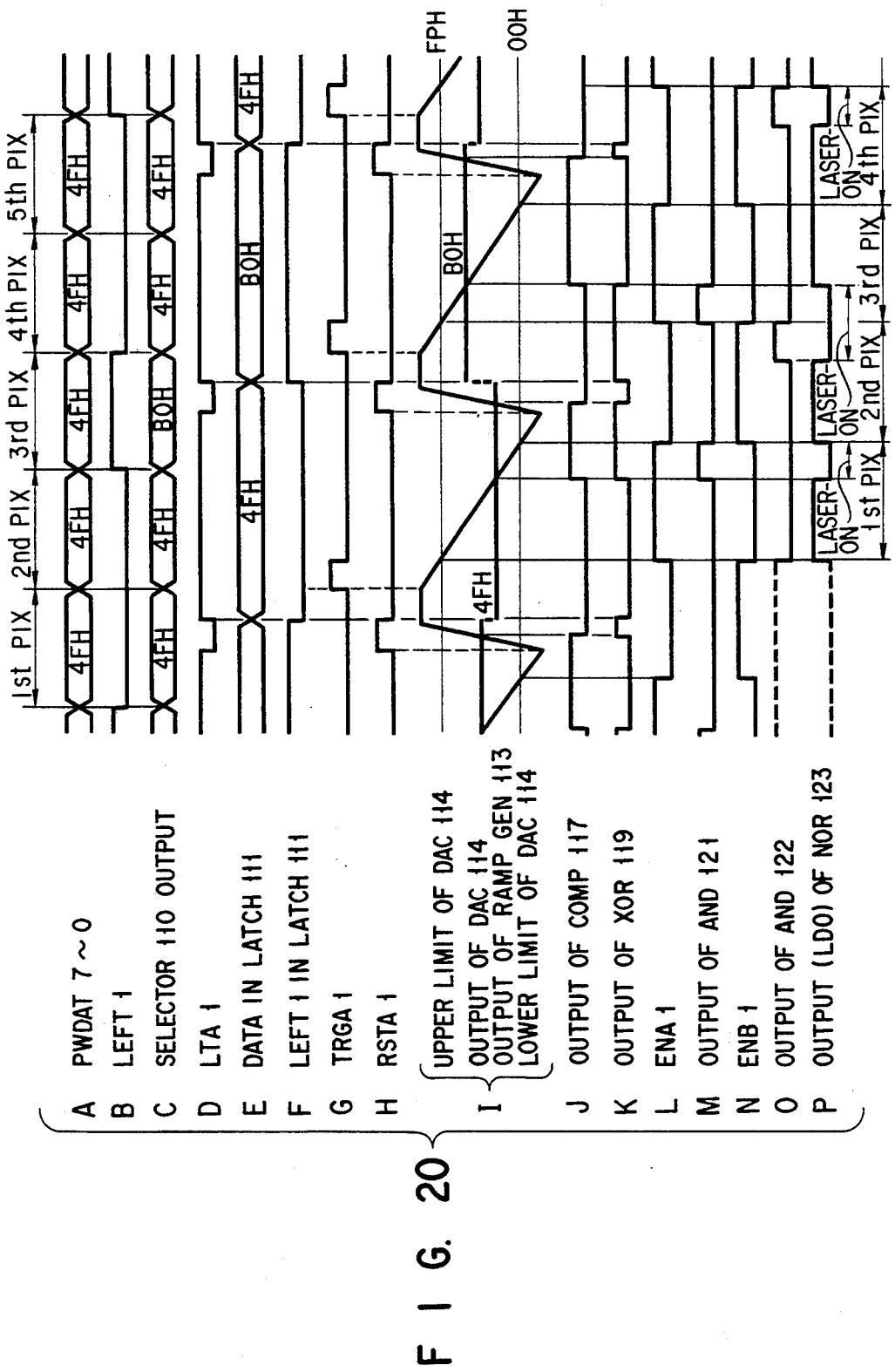

IMAGE FORMING APPARATUS USING VARIABLE LIGHT BEAM

BACKGROUND OF THE INVENTION

1. Field of the Invention

The present invention relates to an image forming apparatus, such as a laser printer, a digital copying machine or a facsimile apparatus.

2. Description of the Related Art

In an image forming apparatus, such as a laser printer or a digital copying machine, a dither method, a density pattern method, an error diffusion method, or the like is generally used as a recording method designed to improve the quality of halftone images.

Although such a recording method allows proper reproduction of halftones, it is accompanied by inconveniences, e.g., a decrease in resolution, the generation of a moiré, the generation of textures, and the generation of rugged portions at oblique lines or curved lines.

In an image forming apparatus using laser exposure, a scheme based on pulse width modulation has been studied to compensate for these drawbacks. In this scheme, the radiation time of a laser beam within one pixel is controlled by an area gradation method. U.S. Pat. No. 4,626,923 (Yoshida), for example, discloses such a scheme.

Even in this case, however, since the radiation time of a laser beam is modulated with a pulse width, cracks in an image or halftones cannot be smoothly expressed, resulting in poor image quality.

That is, such modulation of the radiation time of a laser beam with a pulse width causes the problem that an image is partially omitted or halftones cannot be smoothly expressed.

SUMMARY OF THE INVENTION

It is an object of the present invention to provide an image forming apparatus which can prevent cracks in an image and can smoothly express halftones to obtain a high-quality image.

According to the present invention, there is provided an image forming apparatus comprising image forming means for forming an image in units of pixels by radiating a light beam on an image carrier, selecting means for selecting a beam size of a light beam radiated by the image forming means on the basis of image data to be used for image formation by the image forming means, and control means for controlling the time for which a light beam is radiated by the image forming means, on the basis of the image data to be used for image formation by the image forming means.

According to the present invention, in accordance with the image data of an image formation pixel and adjacent image data located before and after it, the pulse position of the image formation pixel, i.e., whether to shift the radiation timing of a laser beam to the left or the right within one pixel, is selected, and whether to squeeze the laser beam to reduce its beam size or broaden it to increase its beam size is selected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view for explaining a main part of an exposer unit in FIG. 1;

FIG. 4 is a view for explaining a change in laser beam figure with a change in optical path length;

FIG. 5 show the relationship between a laser drive pulse, an optical energy distribution, and an image;

FIG. 6 show the relationship between a laser drive pulse, an optical energy distribution, and an image;

FIG. 7 are views respectively showing a desired image and an image formed in a state wherein optical energy is concentrated;

FIG. 8 show the relationship between a laser drive pulse, an optical energy distribution, and an image;

FIG. 10 is a block diagram showing the arrangement of an image signal processor in FIG. 1;

FIG. 13 are charts showing the relationship between a laser beam figure, control of the pulse position, and a print result;

FIG. 16 show the relationship between density data, a pulse-width-modulated signal, and a print result for three continuous pixels in the main scanning direction;

FIG. 20 are timing charts for explaining an operation of the pulse generator in FIG. 18.

DETAILED DESCRIPTION OF THE PREFERRED EMBODIMENTS

An embodiment of the present invention will be described below with reference to the accompanying drawings.

Figure 2:
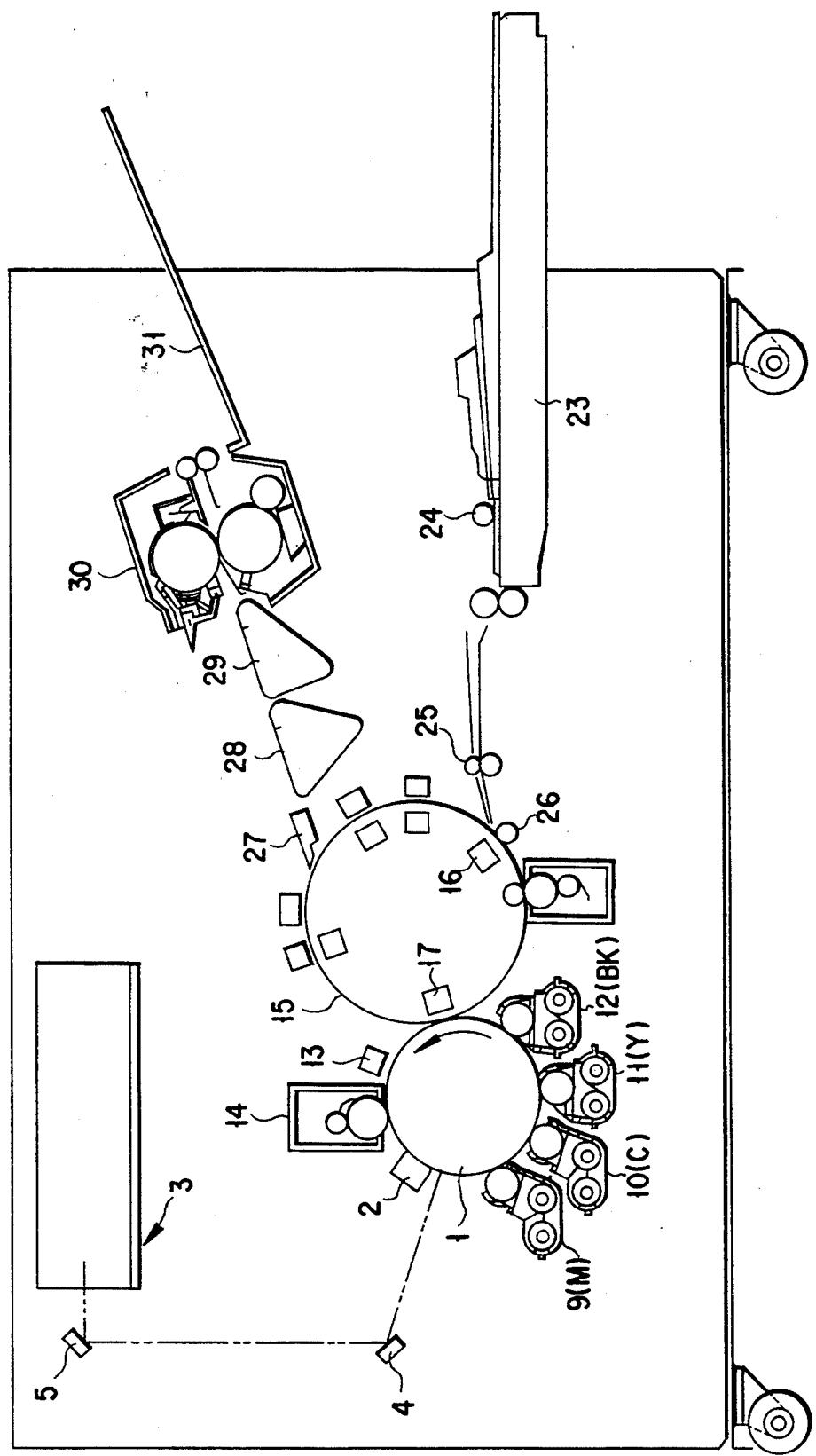
FIG. 2 is a longitudinal sectional view of the image forming apparatus in FIG. 1.

FIG. 2 is a sectional view showing a full-color recording apparatus as an image forming apparatus.

Referring to FIG. 2, reference numeral 1 denotes a photosensitive drum as an image carrier which is rotated counterclockwise. The following components are arranged around the photosensitive drum 1: a charger 2, first developing unit 9, second developing unit 10, third developing unit 11, fourth developing unit 12, transfer drum 15 as a transfer medium support member, discharger 13 and cleaner 14.

The laser beam output from exposure unit 3 is reflected by mirrors 5 and 4, and the reflected beam exposes part of drum 1 between charger 2 and first developing unit 9. Exposure unit 3 is formed of semiconductor laser devices (laser diodes) 45 and 46 (to be described later), polygon mirror 7 for scanning the laser light (laser beam), motor 8 for driving polygon mirror 7 and half-mirror 47. Developing units 9 to 12 respectively develop electrostatic latent images on photosensitive drum 1 with toners of four different colors. For example, first to fourth developing units 9 to 12 respectively contain magenta, cyan, yellow, and black toners.

After the surface of photosensitive drum 1 is uniformly charged by charger 2, photosensitive drum 1 is exposed by exposer unit 3 and in accordance with image data to form electrostatic latent images. The images are respectively developed by corresponding developing units 9 to 12. The developed images are sequentially transferred onto a transfer medium, which is electrostatically drawn to transfer drum 15, by transfer charger 17. The residual toner on photosensitive drum 1 is discharged by discharger 13 and is removed by cleaner 14.

A paper sheet as a transfer medium is fed from cassette 23 by pickup roller 24 and is temporarily aligned by registration rollers 25. The transfer medium is conveyed to drawing roller 26 and drawing charger 16, which are arranged at positions corresponding to a drawing position on transfer drum 15, by registration rollers 25 and is electrostatically drawn to transfer drum 15 by drawing charger 16. Thereafter, as described above, the color toner on photosensitive drum 1 is transferred by transfer charger 17 arranged at a position opposite photosensitive drum 1. When multiple color printing is to be performed, the above-described developing process and transfer process are repeated a maximum of four times. The transfer medium is then separated from transfer drum 15 by separating portion 27 and is discharged onto tray 31 through conveyor belts 28 and 29 and fuser 30.

A control system for a full-color recording system will be briefly described below with reference to FIG. 1.

Figure 1:
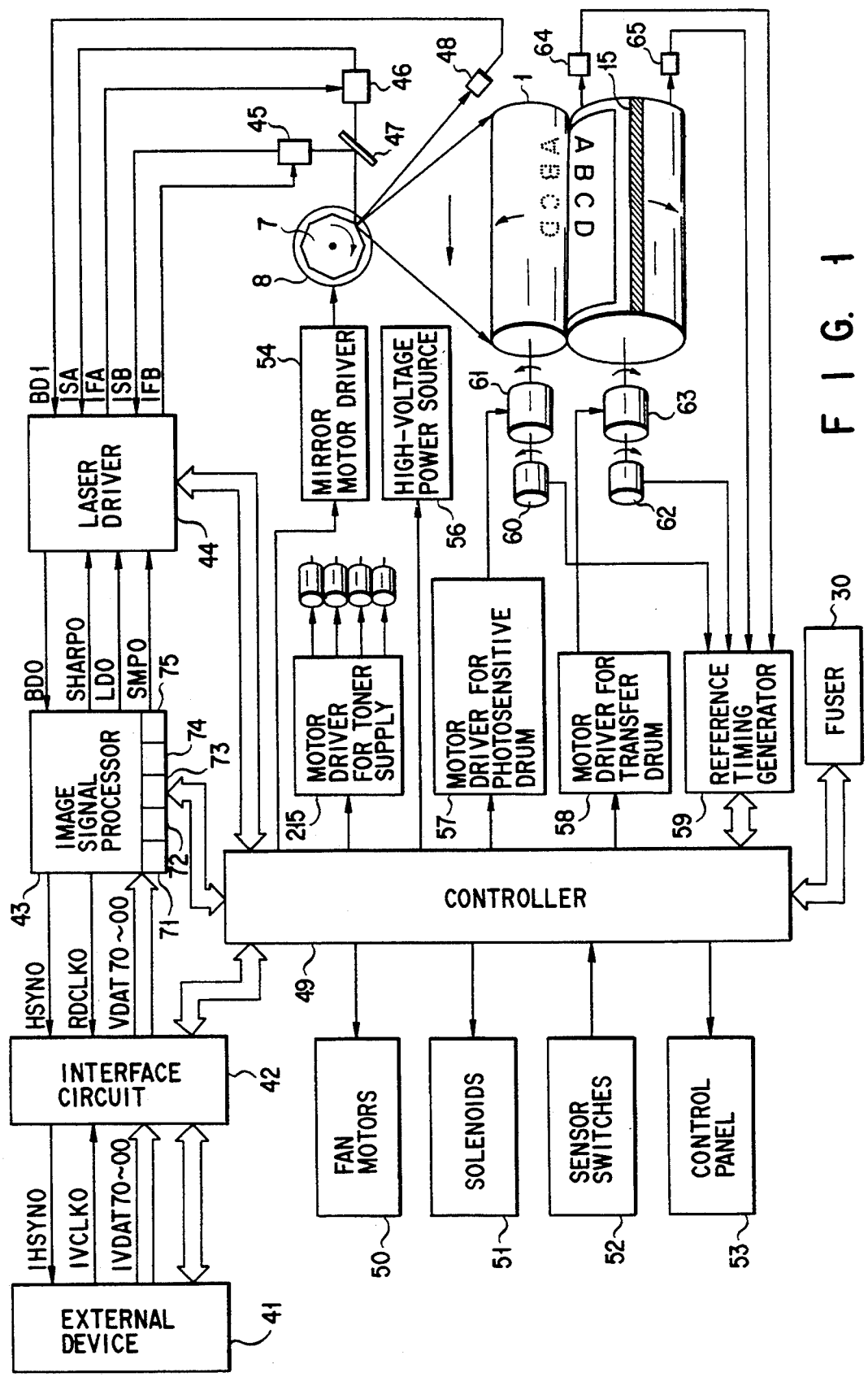
FIG. 1 is a block diagram showing the arrangement of the overall control system of an image forming apparatus according to an embodiment of the present invention.

Referring to FIG. 1, reference numeral 41 denotes an external device connected to this full-color recording apparatus through interface circuit 42. As external device 41, for example, a color scanner, a computer, a word processor, a personal computer, or an image processor can be connected.

The following interface signals are supplied from/to this apparatus: signal IHSYN0 which is a horizontal sync signal to be output from the apparatus to external device 41 prior to transfer of image data corresponding to one scanning operation; signal IVCLK0 which is a clock signal to be output from external device 41 to the apparatus; and signal IVDAT70-00 which is image data to be transferred from external device 41 to the apparatus in synchronism with signal IVCLK0.

Note that signal IVDAT70-00 is image data corresponding to an operation (color stage) of the image forming apparatus. As described above, the apparatus incorporates four developing units 9 to 12, so that when a recording operation is to be performed by using developing unit 9 for magenta, magenta image data is transferred, as signal IVDAT70-00, from external device 41 to the apparatus. Similarly, cyan, yellow, and black image data are transferred from external device 41 to the apparatus when recording operations are to be operated by cyan, yellow, and black developing units 10 to 12, respectively.

In addition, various types of signals required for control operations between external device 41 and the apparatus are prepared. External device 41 can control the apparatus using these signals.

Interface circuit 42 includes a plurality of line buffers for temporarily storing image data transferred from external device 41 and hence can process image data asynchronously with respect to external device 41.

Reference numeral 43 denotes an image signal processor for reading out image data stored in the line buffers of interface circuit 42 and performing predetermined processing (to be described in detail later). Signal HSYN0 is equivalent to signal IHSYN0 described above. Signal RDCLK0 is a read clock used to read out image data from a given line buffer incorporated in interface circuit 42.

Data VDAT70-00 is image data read out from a given line buffer. Signal BD0 is a signal obtained by inverting signal BD1 (to be described later) and supplied from laser driver 44 to image signal processor 43. Signals IHSYN0 and HSYN0 described above are formed on the basis of the timing of this signal BD0. Signal SHARP0 is a signal for selecting a laser beam to be scanned on photosensitive drum 1. More specifically, when this signal SHARP0 is at low level (to be referred to as L level hereinafter), a laser beam having a small beam size (focused optical energy) is scanned on photosensitive drum 1.

If signal SHARP0 signal is at high level (to be referred to as H level hereinafter), a laser beam having a large beam size (diffused optical energy) is scanned on photosensitive drum 1. Signal LD0 is a laser drive signal which changes in accordance with image data VDAT70-00.

If signal LD0 is at L level, laser diode 45 or 46 emits light. Otherwise, laser diode 45 or 46 does not emit light. Signal SMP0 is used to forcibly cause laser diode 45 or 46 to emit light. When this signal SMP0 is set at L level, laser diode 45 or 46 emits light. Signal SMP0 serves to forcibly cause laser diode 45 or 45 to emit light in a region other than an image formation region so as to measure its light emission power, and also serves as a signal for obtaining reference signal BD1 (BD0) from photodiode 48.

Laser driver 44 is a circuit for causing laser diode 45 or 46 to emit light in response to signals SHARP0, LD0, and SMP0 from image signal processor 43, and receiving reference signal BD1 from photodiode 48. Reference symbol IFA denotes a signal for causing laser diode 46 to emit light; ISA, a monitor signal for the light emission power of laser diode 46; IFB, a signal for causing laser diode 45 to emit light; and ISB, a monitor signal for the light emission power of laser diode 45.

Laser driver 44 monitors the light emission power of laser diode 45 or 46 and controls laser diode 45 or 46 to emit light with power designated by controller 49. Reference numeral 47 denotes a half mirror arranged to allow laser beams emitted from both laser diodes 45 and 46 to reach photosensitive drum 1.

Controller 49 is constituted by a microcomputer and its peripheral circuits and is designed to process various types of data and perform various types of control operations. The following are the main functions of controller 49:

(1) decoding information from interface circuit 42, i.e., a command from external device 41, to control the respective components in accordance with the command, and outputting a status corresponding to the command to external device 41 through interface circuit 42;

(2) outputting display information to the display LED (not shown) or 7-segment display unit (not shown) of control panel 53;

(3) ON/OFF-controlling various types of solenoids 51;

(4) fetching and processing information from various types of switches and sensors 52;

(5) setting various parameters in image signal processor 43 and transferring internally generated pattern data thereto;

(6) ON/OFF-controlling mirror motor 8 for mirror motor driver (7) setting laser emission power for laser driver 44 and monitoring its power;

(8) controlling high-voltage power source 56, i.e., ON/OFF-controlling charger 2, transfer charger 17, the developing bias, drawing charger 16, and other high-voltage outputs and setting their output power, and monitoring the respective outputs to check whether they operate properly;

(9) ON/OFF-controlling motor driver 57 for the photosensitive drum and motor driver 58 for the transfer drum and monitoring them to check whether they are rotating normally;

(10) ON/OFF-controlling various types of fan motors 50;

(11) ON/OFF-controlling a pre-exposure lamp (not shown);

(12) monitoring the temperature of the heat roller pair of fuser 30 and ON/OFF-controlling its heater lamp;

(13) controlling the operation timing of the apparatus in accordance with signals from reference timing generator 59; and

(14) controlling motor driver 215 for toner supply to drive one of four toner supply motors which corresponds to a toner color required to be supplied.

As briefly described above, controller 49 is equivalent to a main controller of the apparatus.

A driving system for photosensitive drum 1 and transfer drum 15 will be briefly described below.

As shown in FIG. 1, photosensitive drum 1, photosensitive drum motor 61, and photosensitive encoder 60 are coaxially arranged. Therefore, an output from encoder 60 can be used as rotation information of photosensitive drum 1.

Similarly, transfer drum 15, transfer drum motor 63, and transfer drum encoder 62 are coaxially arranged. Therefore, an output from encoder 62 can be used as rotation information of transfer drum 15.

Both the outputs from photosensitive drum motor encoder 60 and transfer drum motor encoder 62 are input to reference timing generator 59.

Both sensors 64 and 65 are located on one side of transfer drum 15 and are designed to output signals when transfer drum 15 comes to specific rotational positions. For example, a projection is formed on an end portion of transfer drum 15, and photointerrupters are arranged at points where the projection passes through.

The outputs from two sensors 64 and 65 are input to reference timing generator 59.

Exposer unit (optical system) 3 (FIG. 8) of the apparatus will be described in detail below. As described above, in this apparatus, two laser diodes 45 and 46 are mounted so that exposure can be performed by using laser diode 45 or 46 which is suitable for an image to be recorded. The positional relationship between two laser diodes 45 and 46, half mirror 47, and polygon mirror 7 will be described below with reference to FIG. 3.

As shown in FIG. 3, a laser beam emitted from laser diode 45 is reflected by half mirror 47 to reach polygon mirror 7. A laser beam emitted from laser diode 46 passes through half mirror 47 to reach polygon mirror 7. The optical paths of laser beams from laser diodes 45 and 46 to polygon mirror 7 are adjusted to coincide with each other.

In addition, distance DB between laser diode 45 and half mirror 47 is set to be smaller than distance DA between laser diode 45 and half mirror 47 by about 3 mm. Therefore, the optical path length from laser diode 45 to photosensitive drum 1 is shorter by about 3 mm than that path from laser diode 46 to photosensitive drum 1.

FIG. 4 is an enlarged view of a state wherein photosensitive drum 1 is exposed by laser beams emitted from laser diodes 45 and 46 having different optical path lengths. As shown in FIG. 4, laser beams a1 and a2 output from exposer unit 3 gradually taper away and expose photosensitive drum 1. Laser beam a1 shown in FIG. 4 exposes photosensitive drum 1 at a point where its beam size is minimized. Laser beam a1 corresponds to a laser beam emitted from laser diode 45.

The beam size of laser beam a2 on photosensitive drum 1 is larger than that of laser beam a1. This laser beam corresponds to a laser beam emitted from laser diode 46. Distance d from a point where laser beam a2 has the minimum beam size to the surface of photosensitive drum 1 is about 3 mm, which is equal to the difference between the optical path lengths from two laser diodes 45 and 46 to photosensitive drum 1.

Note that beam sizes $\phi 1$ and $\phi 2$ of laser beams a1 and a2 on photosensitive drum 1 in the main scanning direction are about 10 $\mu$m and about 50 $\mu$m, respectively. The optical energy distributions and images obtained by performing image forming operations using laser beams having different beam sizes in the main scanning direction will be described below with reference to FIGS. 5 to 9.

The left portion of FIG. 5 indicates the relationship between a laser drive pulse (LD0), an optical energy distribution, and an image, obtained when a laser beam is emitted for a certain unit time while the optical energy of the laser beam is concentrated. As shown in FIG. 5B, the optical energy exhibits a steeply peaked (mountain-like) distribution.

Since such a mountain-like distribution is difficult to consider, a simple rectangular optical energy distribution will be considered, as indicated by the right portion of FIG. 5B. In addition, a rectangular image is considered an image model. In this case, signal SHARP0 output from image signal processor 43 is at L level, and a laser beam emitted from laser diode 45 and radiated on photosensitive drum 1 corresponds to a position where the laser beam is squeezed most. In this state, the laser beam is narrow, like the laser beam having beam size $\phi 1$ shown in FIG. 4.

FIG. 6 show the optical energy distributions and images obtained upon application of a laser drive pulse (LD0) signal which is pulse-width-modulated by such a laser beam model. As is apparent from FIGS. 6A-6C, if an image forming operation is performed in a state wherein optical energy is concentrated, an image having distinctive black and white portions and faithful to the laser drive pulse (LD0) signal can be provided.

Referring to FIG. 6, reference symbol P denotes a time and a distance corresponding to one pixel. A laser beam is scanned from left to right. As a result, an image shown in FIG. 7B can be obtained with respect to a desired image shown in FIG. 7A. Therefore, an image having no gradation, such as a character or a line drawing, can be printed with high image quality.

FIG. 8 show the relationship between a laser drive pulse (LD0), an optical energy distribution, and an image obtained when a laser beam is emitted for a certain unit time while the optical energy distribution of the laser beam is gradually spread as compared with that shown in FIGS. 5A-5C. As shown in FIG. 8, the optical energy exhibits a gradual mountain-like distribution. The total quantity of the optical energy in FIG. 8 is the same as that shown in FIG. 5 in which the optical energy is concentrated.

The density of the resulting image is decreased, as compared with the case shown in FIGS. 5A-5C, according to a reduction in optical energy per unit area. The right portion of FIG. 8 shows this state as a model in the same manner as shown in FIGS. 5A-5C. As shown in FIGS. 8A-8C, the optical energy distribution can be approximated to a horizontally elongated rectangular waveform, whereas the image can be approximated to a square. In this case, signal SHARP0 output from image signal processor 43 is at H level, and a laser beam emitted from laser diode 46 and radiated on photosensitive drum 1 corresponds to a position deviated from a position where the laser beam is squeezed most. In this state, the laser beam is wide, like the laser beam having beam size $\phi 2$ shown in FIG. 4.

Figure 9:
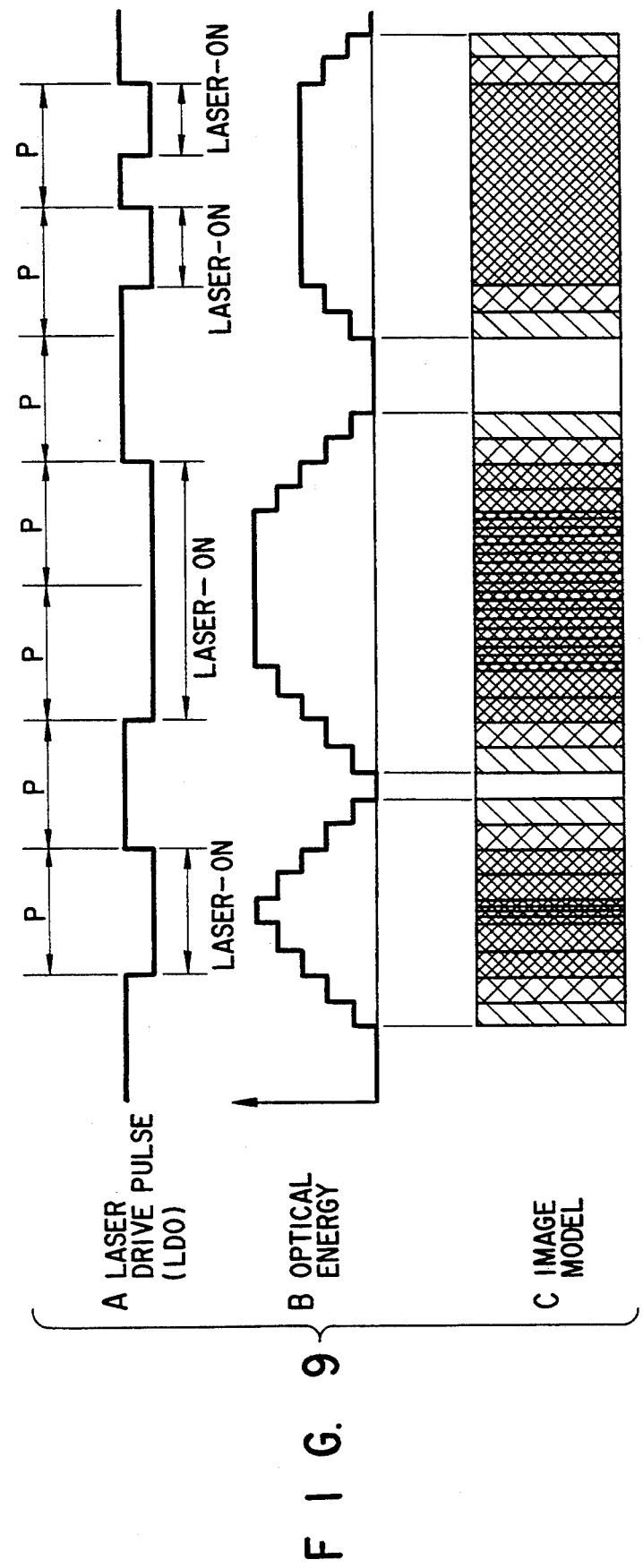
FIG. 9 show the relationship between a laser drive pulse, an optical energy distribution, and an image.

FIG. 9 show a state of an optical energy distribution and an image, as a model, obtained upon application of a signal equivalent to the pulse-width-modulated laser drive pulse (LD0) shown in FIGS. 6A-6C by using a laser beam whose optical energy is diffused to a certain degree as shown in FIG. 8. As is apparent from FIG. 9 when the optical energy is diffused, it exhibits a mountain-like distribution and hence can be output at intermediate energy levels which do not appear in FIG. 6. If photosensitive drum 1 is exposed with such an optical energy distribution, and a developing operation is performed, halftones can be expressed. The image shown in FIG. 9 indicates that the image density is increased with an increase in optical energy.

Therefore, an image having gradation, e.g., a photograph, can be printed with excellent image quality.

As described above, the beam figure of a laser beam used for an image writing operation can be changed in accordance with the type of image to be recorded. That is, a laser beam used for an image writing operation is reduced in beam size, when an image such as a character or a line drawing is to be recorded, and is increased in beam size, when an image having gradation, e.g., a photograph, is to be recorded, thereby reproducing any type of image with high image quality.

As shown in FIG. 10, image signal processor 43 is constituted by timing generator 71, radiation timing and laser beam figure control signal generator 72, conversion table 73, pulse generator 74, and toner consumption counter 75.

Figure 11:
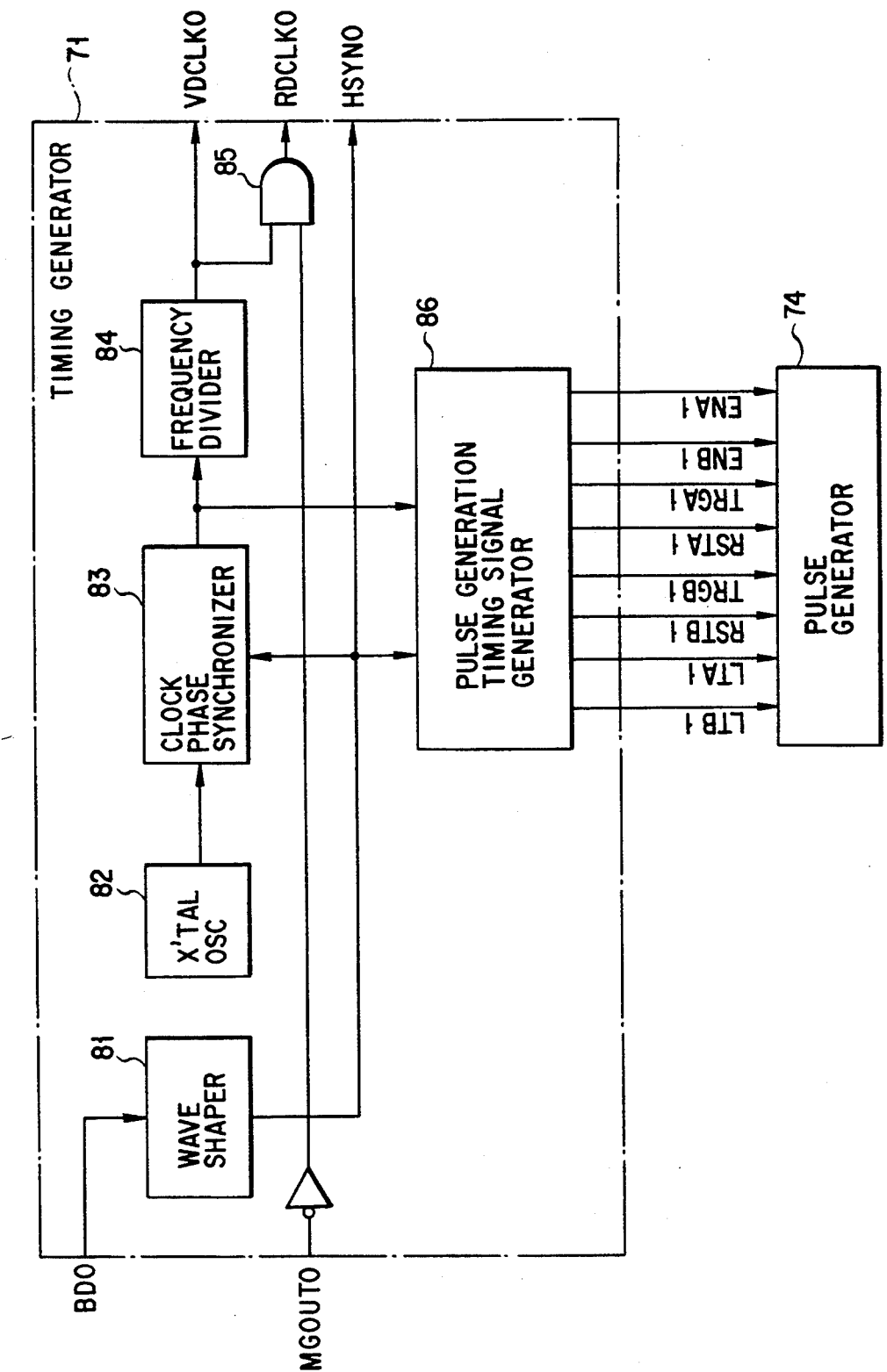
FIG. 11 is a block diagram showing the arrangement of a timing generator in FIG. 10.
Figure 12:
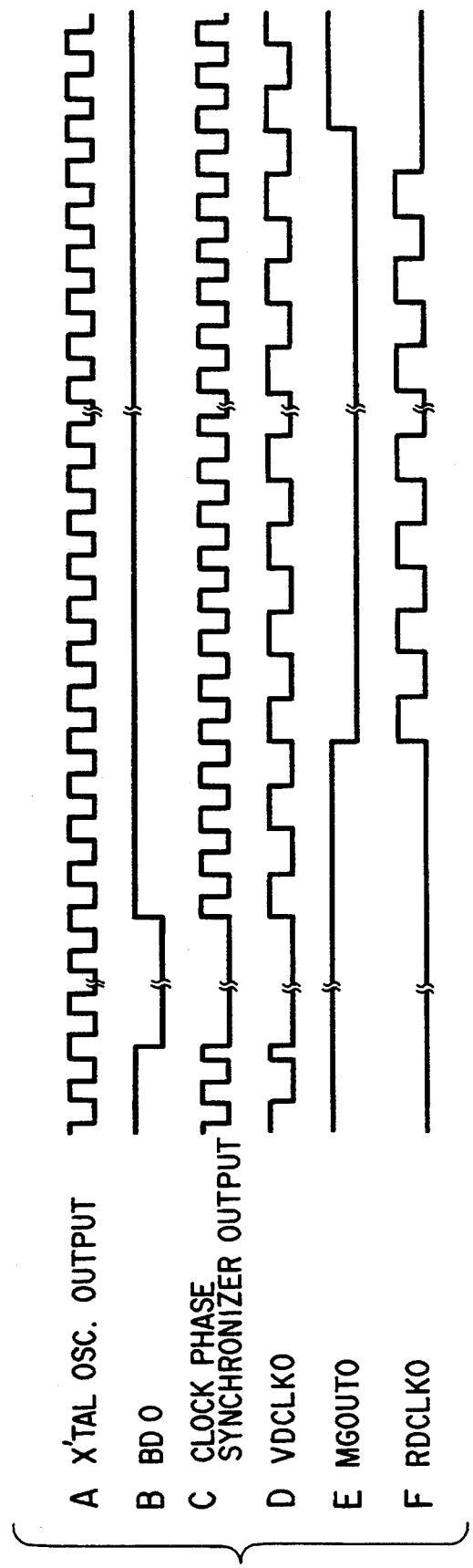
FIG. 12 are timing charts for explaining an operation of the timing generator in FIG. 10.

FIG. 11 shows the arrangement of timing generator 71. FIG. 12 are timing charts of timing generator 71.

As shown in FIG. 11, timing generator 71 is constituted by wave shaper 81, crystal oscillator 82, clock phase synchronizer 83, frequency divider 84, AND gate 85, and pulse generation timing signal generator 86.

Timing generator 71 serves to generate reference signals, required for the respective circuits, from signals BD0 and MGOUT0. Signal BD0 is formed on the basis of signal BD1 and is at L level during a period in which a laser beam scanned by the polygon mirror passes through the photodiode. In other periods, signal BD1 is at H level.

Wave shaper 81 outputs signal HSYN0 having a negative level and a constant pulse width with reference to the leading or trailing edge of signal BD0. Crystal oscillator 82 is a clock source, which always outputs clocks at a stable frequency. Clock phase synchronizer 83 serves to synchronize the phase of the clock oscillated by crystal oscillator 82 with the leading edge of signal HSYN0. The synchronized clock always has a constant phase relationship with the leading edge of signal HSYN0. The synchronized clock is divided into halves by frequency divider 84.

Controller 49 generates signal MGOUT0 (L level in an image region, H level in other regions) representing an image region (printing range) on the basis of clock VDCLK0 synchronized with signal HSYNC0. Signal VDCLK0 is input to AND gate 85 together with a signal obtained by inverting signal MGOUT0 representing the image region, thus generating signal RDCLK0. Signal RDCLK0 is output only in an image region and serves as a reference clock used to read out image data.

Pulse generation timing signal generator 86 generates an enable signal, a trigger signal, a reset signal, a latch selection signal, and the like, as timing signals required for pulse generator 74, from the synchronized clock (output from clock phase synchronizer 83) and signal HSYN0.

Radiation timing and laser beam figure control signal generator 72 selects the pulse position of a pixel to be printed, i.e., whether a laser emission timing within one pixel is left-shifted or right-shifted, in accordance with the image data of the target pixel and image data of the adjacent pixels before and after the target pixel. In addition, radiation timing and laser beam figure control signal generator 72 selects whether to squeeze a laser beam to reduce its beam size or to broaden it to increase its beam size, thus realizing high-quality printing.

The relationship between control of the beam figure of a laser beam and the pulse position and a print result will be described with reference to FIG. 13.

FIG. 13A shows an original or a final image to be expressed. In this case, a high-density line is present in a low-density, continuous portion.

FIG. 13B shows the image density on one scan line in FIG. 13A.

FIG. 13C shows image data continuous in the main scanning direction, obtained by reading the original and sampling it in units of pixels. Larger image data indicates a higher image density of a pixel to be printed.

FIG. 13 show print results obtained in accordance with this image data. In FIG. 13G, "L" in the upper row denotes a large beam size, and "S" denotes a small beam size. Also in FIG. 13G, "R" in the lower row denotes a right position, and "L" denotes a left position.

FIG. 13D shows a print result obtained when the beam size of a laser beam is reduced, and the pulse position is fixed at a left-shifted position. Density data is converted into a laser-on period within one pixel. When the beam size is set to be small, a low-density pixel is printed as a narrow line; and a high-density pixel, as a wide line. Therefore, a density difference is expressed as the ratio of the area of a printed portion in one pixel to the area of a non-printed portion. In this case, since a halftone is expressed as the width of a line, some image may become undesirably conspicuous as a vertical stripe (especially an image in which a halftone portion having the same density is present in a wide area).

FIG. 13E shows a print result obtained when the beam size of a laser beam is increased. Since the beam size is increased, a laser-on period is not printed as the width of a line but is printed as a density level. This may cause the following phenomena: the generation of an out-of-focus portion at a point where an abrupt change in density occurs and at a high-density point in a continuous, low-density portion, and the disability to respond to changes in density of image data.

FIG. 13F shows a case wherein in order to compensate for the drawback described above, the beam size is increased at a portion where the density is low and a change in density of image data is gradual, while the beam size is reduced at a portion where a high-density pixel is present or an abrupt change in density occurs, thus shifting the pulse position to a pixel, of adjacent pixels, which has a higher density. With this operation, conspicuous vertical stripes and out-of-focus images can be prevented to realize printing with high image quality.

A practical control method of selecting a beam figure of a laser beam and a pulse position on the basis of image data supplied from controller 49 will be described below with reference to FIGS. 14-16.

Figure 14:
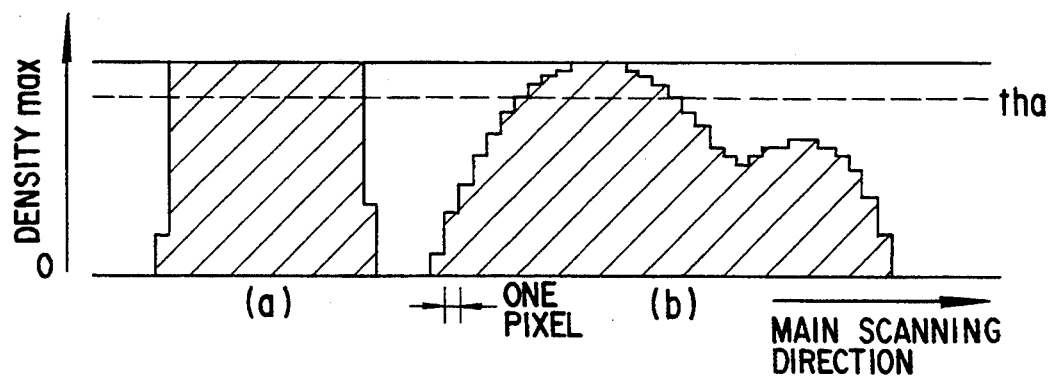
FIG. 14 is a graph showing changes in image data in the main scanning direction in units of pixels.
Figure 15:
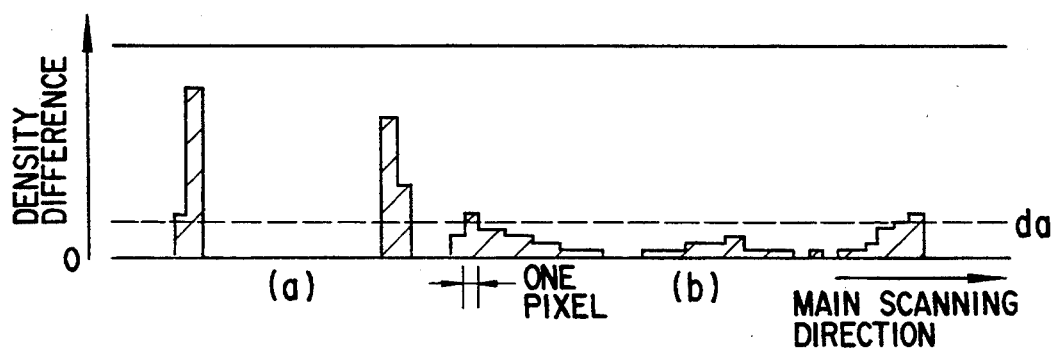
FIG. 15 is a graph showing the absolute value of the difference between given image data and image data one pixel ahead thereof in the main scanning direction.

FIG. 14 is a graph showing changes in image data (image density) in the main scanning direction. FIG. 15 is a graph showing the absolute value of the difference between the image data of a given pixel and that of an immediately preceding pixel in the main scanning direction. Referring to FIGS. 14 and 15, reference symbol (a) denotes high-density image data having an abrupt density change, e.g., a character or a line; and (b), image data having a continuous density change, e.g., a photograph.

FIG. 16 are views based on three continuous pixels in the main scanning direction, in which data to be printed is pixel b and its adjacent data are pixels a and c.

In this case, the selection conditions of the beam figure of a laser beam and the pulse position are set as follows: (1) the absolute value of the difference between target pixel b and adjacent pixel a or c is larger than reference data value da (80h) (h indicates hexadecimal notation); and (2) the density of target pixel b or adjacent pixel a or c is greater than reference data value tha (E0h).

If at least one of conditions (1) and (2) is satisfied, the beam size of a laser beam is set to be small. Otherwise, the beam size is set to be large.

In addition, the pulse position is shifted to one of adjacent pixels a and c which has a higher density.

Figure 17:
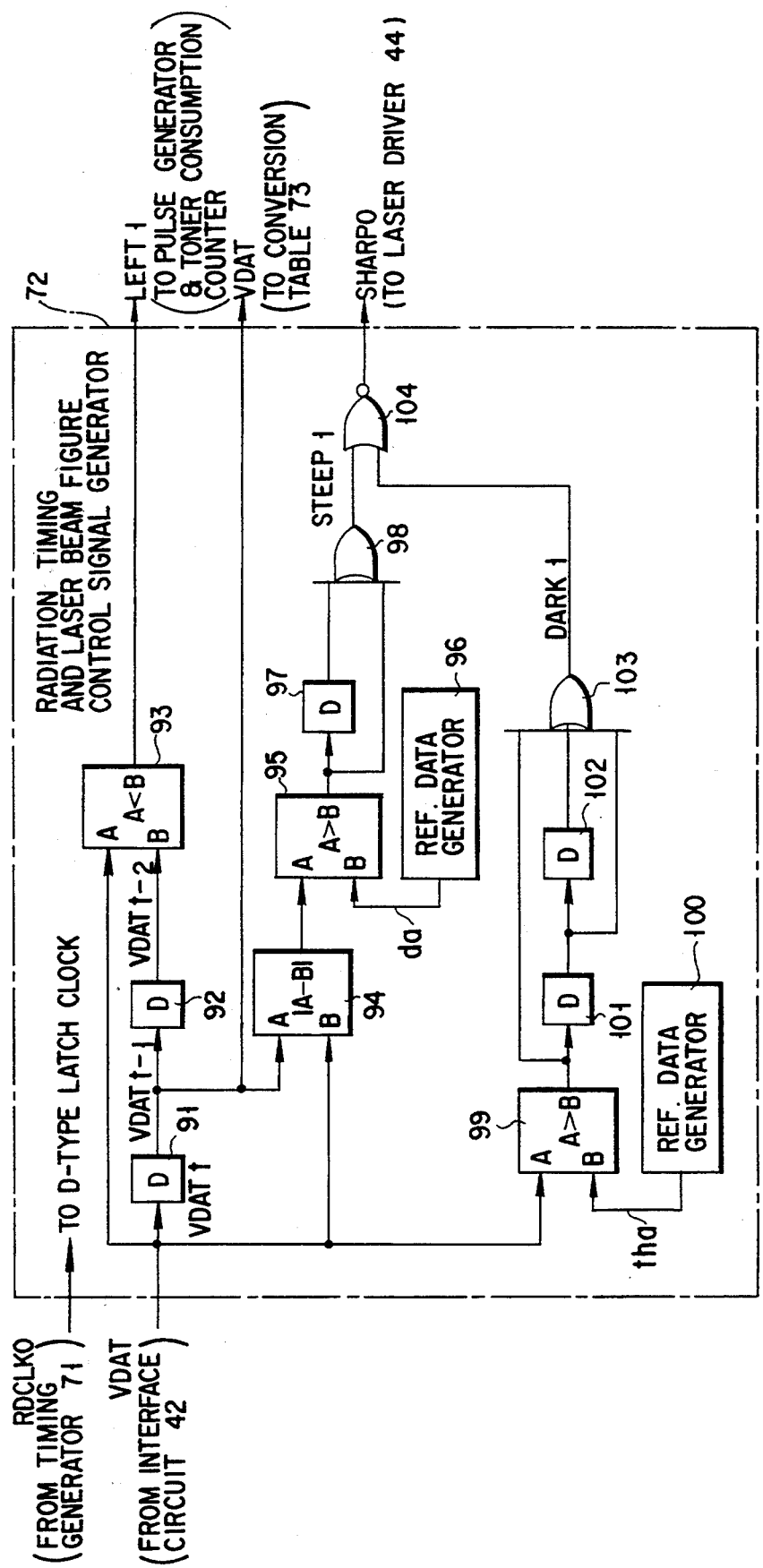
FIG. 17 is a block diagram showing the arrangement of a radiation timing control signal generator for laser beam figure in FIG. 10.

FIG. 17 is a block diagram showing an arrangement of radiation timing and laser beam figure control signal generator 72, which comprises 8-bit D (delay)-type latches 91 and 92, 1-bit D-type latches 97, 101, and 102, comparators 93, 95, and 99, arithmetic circuit 94, OR circuits 98 and 103, and NOR circuit 104.

Radiation timing and laser beam figure control signal generator 72 receives pixel b to be printed (image data $VDAT_{t-1}$) and adjacent pixels a (image data $VDAT_{t-2}$) and c (image data $VDAT_t$), located before and after pixel b in the main scanning direction, from interface circuit 42, and outputs pulse position signal LEFT1 (indicating whether a laser-on period is shifted to the left or right within one pixel) of target pixel b, and beam size selection signal SHARP0 (to be set at L level to select a small beam size and set at H level to select a large beam size). Note that common clock RDCLK0 (supplied from timing generator 71) is input to all the latches. Each of the latches (91, ...) delays an input signal by a 1-pixel time (i.e., stores data of the immediately preceding pixel).

A method of generating pulse position signal LEFT1 will be described below. Image data $VDAT_t$ supplied from interface circuit 42 is delayed by latches 91 and 92 by a 2-pixel time. Image data $VDAT_{t-2}$ delayed by a 2-pixel time is compared with image data $VDAT_t$ currently input from interface circuit 42 by comparator 93. If image data $VDAT_{t-2}$ is larger than image data $VDAT_t$, pulse position signal LEFT1 is set at H level.

A method of generating beam size selection signal SHARP0 will be described next. Image data $VDAT_t$ is directly input to arithmetic circuit 94. At the same time, image data $VDAT_t$ is delayed by latch 91 by a 1-pixel time and input to arithmetic circuit 94. Arithmetic circuit 94 outputs the absolute value of the difference between image data $VDAT_t$ and image data $VDAT_{t-1}$ delayed by a 1-pixel time. An output from arithmetic circuit 94 is compared with reference data value da by comparator 95. When this output exceeds reference data value da, comparator 95 outputs an H-level signal.

OR circuit 98 calculates the logical OR (STEEP1) between the result obtained by comparator 95 and the data delayed by latch 97. That is, when at least one of the absolute values of the differences between image data $VDAT_{t-1}$ of the target pixel and image data $VDAT_t$ of adjacent pixel c and image data $VDAT_{t-2}$ of adjacent pixel a is larger than reference data value da, output STEEP1 from OR circuit 98 is set at H level.

Comparator 99 compares image data $VDAT_t$ with reference data value tha. If image data $VDAT_t$ is larger than reference data value tha, an output from comparator 99 is set at H level. The result obtained by comparator 99 is delayed by latches 101 and 102, so that comparison results corresponding to three pixels are ORed with each other by OR circuit 103 (DARK1). That is, output DARK1 from OR circuit 103 is set at H level when the image data value of one of three pixels a, b, and c is larger than reference data value tha.

Beam size selection signal SHARP0 output from NOR circuit 104 is set at L level when at least output STEEP1 from OR circuit 98 or output DARK1 from OR circuit 103 is at H level.

Image data $VDAT_{t-1}$ of target pixel b is output as image data VDAT (output to conversion table 73) of the output side of radiation timing and laser beam figure control signal generator 72.

Conversion table 73 serves to convert image data VDAT70-00, supplied from interface circuit 42 through radiation timing and laser beam figure control signal generator 72, into pulse-width-modulated data PWDAT7-0. In conversion table 73, arbitrary contents can be selected in accordance with the colors of toners used for development, the type of image, e.g., a character or photographic image, the power of a laser, various process conditions, changes over time, and changes in other conditions. In addition, the contents of conversion table 73 can be replaced with arbitrary data from controller 49.

Pulse generator 74 will be described below with reference to FIGS. 18–20.

Figure 18:
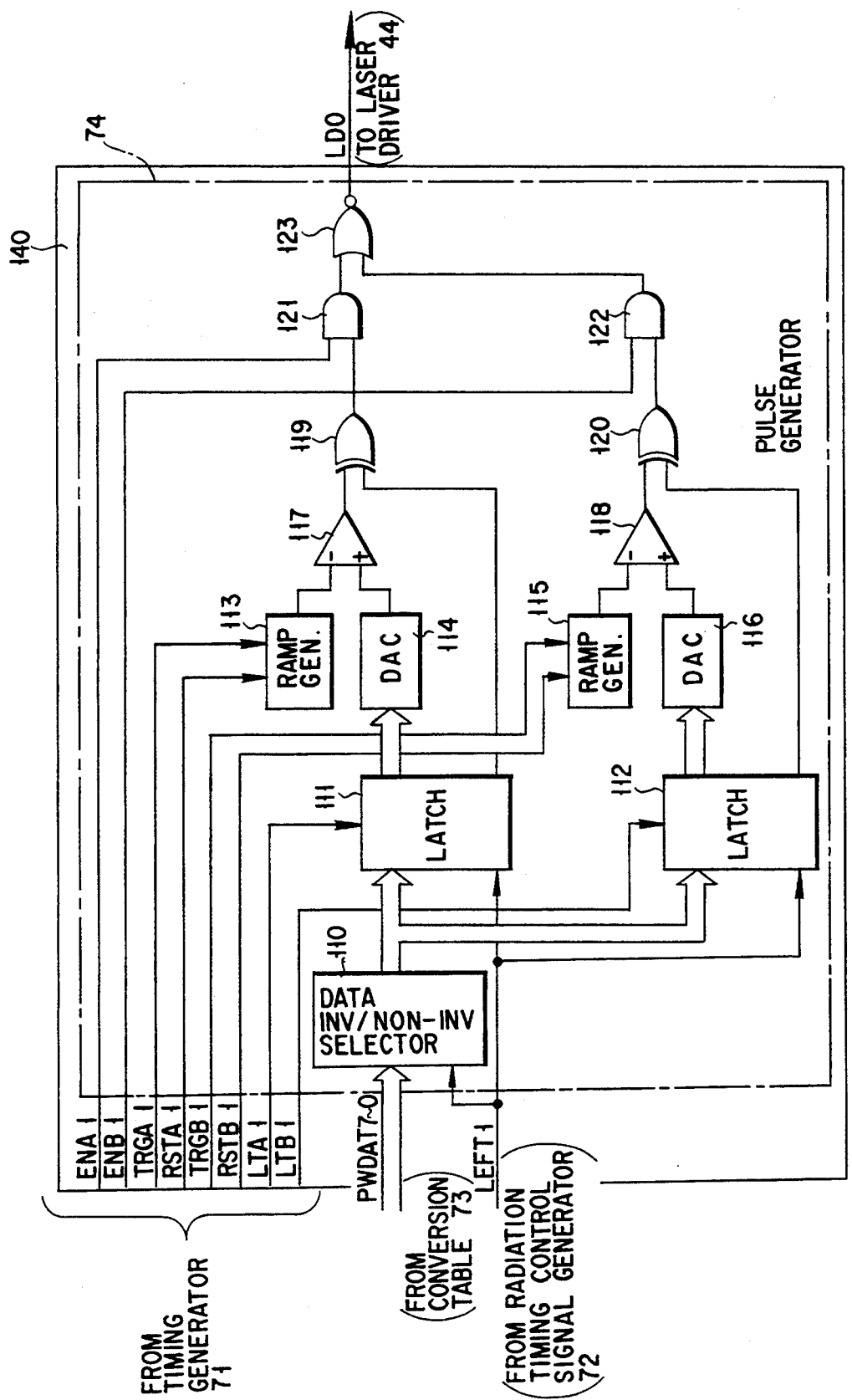
FIG. 18 is a block diagram showing the arrangement of a pulse generator in FIG. 10.

FIG. 18 is a block diagram of pulse generator 74. FIG. 20A to 20P are timing charts of pulse generator 74.

As shown in FIG. 18, pulse generator 74 comprises: data inversion/non-inversion selector 110 for selecting whether to invert pulse width data PWDAT7-0 in accordance with the level of pulse position designation signal LEFT1; a pair of latches 111 and 112 for latching data output from data inversion/non-inversion selector 110 and pulse position designation signal LEFT1; two D/A converters 114 and 116 for respectively converting 8-bit data from latches 111 and 112 into analog signals; ramp generators 113 and 115 for generating triangular waves at different timings; two comparators 117 and 118 for respectively comparing outputs from D/A converters 114 and 116 with outputs from ramp generators 113 and 115; two XOR circuits 119 and 120 for respectively receiving outputs from latches 111 and 112 and from comparators 117 and 118; AND circuits 121 and 122 for respectively receiving outputs from XOR circuits 119 and 120 and signals from timing generator 71; and NOR circuit 123 for receiving outputs from AND circuits 121 and 122.

As is apparent from FIG. 18, two identical circuit systems are arranged after data inversion/non-inversion selector 110. However, different operation timings are set for these circuit systems by signals from timing generator 71.

Figure 19:
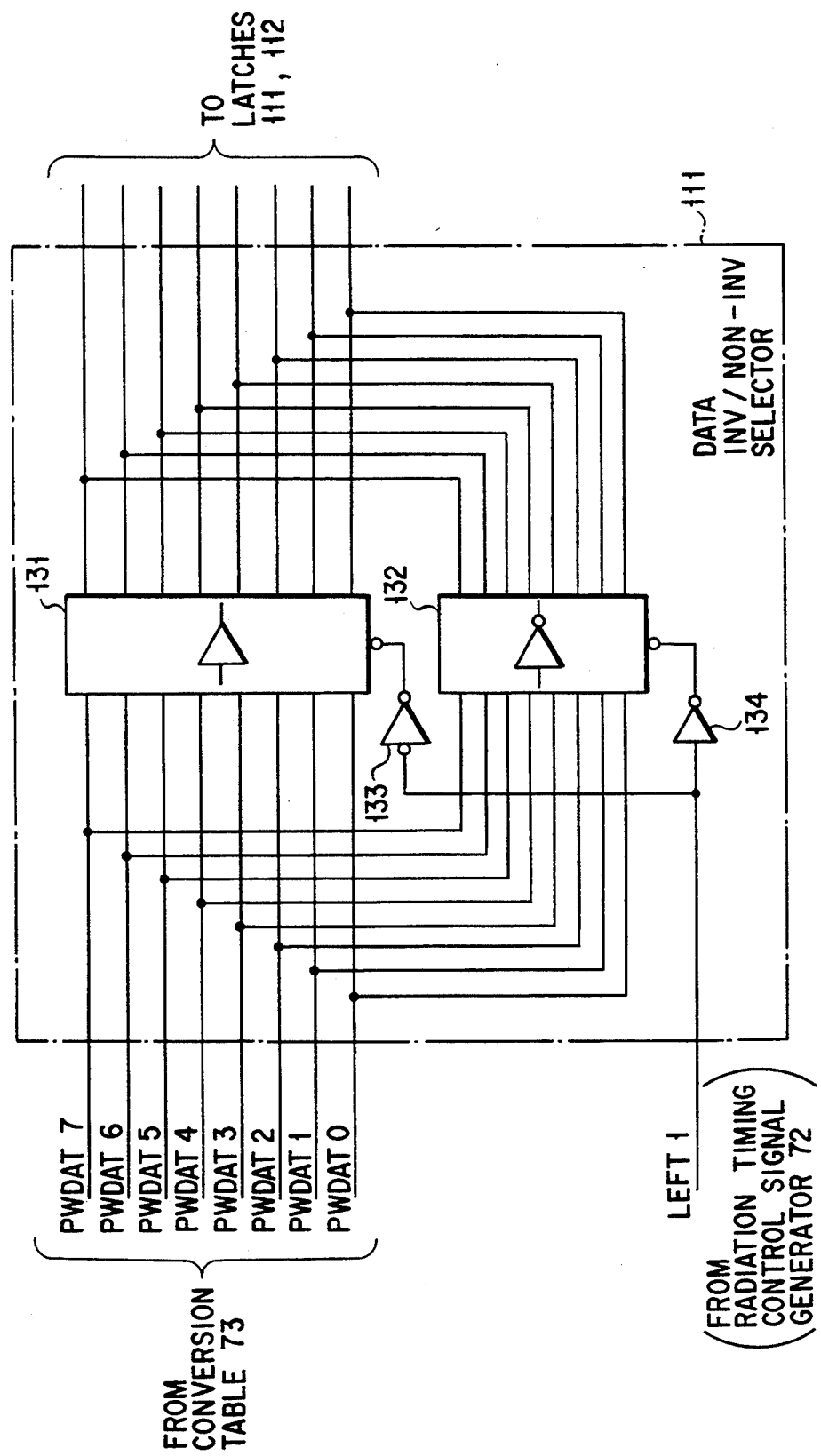
FIG. 19 is a block diagram showing the arrangement of a data inversion/non-inversion selector in FIG. 18.

FIG. 19 shows a detailed circuit arrangement of data inversion/non-inversion selector 110, which comprises non-inversion buffer 131, inversion buffer 132, buffer 133, and inverter 134. As shown in FIG. 19, when pulse position designation signal LEFT1 is at L level, non-inversion buffer 131 is selected so that pulse width data PWDAT7-0 is transferred to latches 111 and 112 without being inverted. In contrast to this, when pulse position designation signal LEFT1 is at H level, inversion buffer 132 is selected to invert pulse width data PWDAT7-0 and transfer it to latches 111 and 112.

The relationship between pulse width data PWDAT7-0, pulse position designation data LEFT1, laser radiation, and an output image will be described below. In pulse width data PWDAT7-0, PWDAT7 and PWDAT0 correspond to the MSB and LSB, respectively.

Pulse width data PWDAT7-0 and the laser radiation time are related with each other such that when PWDAT7-0 is "FFH", the laser radiation time is 100%, and when PWDAT7-0 is "00H", the laser radiation time is 0% (no emission). In this case, "100%" means that a laser beam is radiated throughout the time assigned to one pixel. That is, if pulse width data PWDAT7-0 is, e.g., "4FH", the laser radiation time with respect to the corresponding pixel is about 31%, as indicated by the following equation:

$$4FH/FFH = 79/255 = 0.3098$$

Pluse position designation signal LEFT1 is used to designate a specific timing at which a laser beam is radiated on one of continuous pixels when the laser beam is to be radiated with a radiation time equal to or lower than 100%. That is, when pulse position designation signal LEFT1 is at H level, a laser beam is radiated continuously with the immediately preceding pixel. If pulse position designation signal LEFT1 is at L level, a laser beam is radiated continuously with the immediately succeeding pixel.

In this embodiment wherein a laser beam is scanned on an output image from the left to the right, when pulse position designation signal LEFT1 is at H level, the laser beam is radiated continuously with the pixel on the left side of the target pixel. In contrast to this, when signal LEFT1 is at L level, the laser beam is radiated continuously with the pixel on the right side of the target pixel. In this embodiment, toner particles adhere to a portion exposed to a laser beam.

The flows of signals from pulse generator 74 will be described below with reference to FIG. 20. A case wherein pulse width data PWDAT7-0 is "4FH" and pulse position designation signal LEFT1 is changed as L level→H level→L level, as shown in FIG. 20A, will be exemplified. As described above, inversion or non-inversion of the data input to data inversion/non-inversion selector 110 is selected in accordance with the level of pulse position designation signal LEFT1.

As shown in FIG. 20B, pulse position designation signals LEFT1 with respect to the first two pixels of pulse width data PWDAT7-0 are at L level, whereas pulse position designation signal LEFT1 with respect to the third pixel of pulse width data PWDAT7-0 is at H level. In addition, pulse position designation signals LEFT1 with respect to the fourth and fifth pixels of pulse width data PWDAT7-0 are at L level. Therefore, of the data output from data inversion/non-inversion selector 110, data corresponding to the first, second, fourth, and fifth pixels are "4FH", and data corresponding to the third pixel is "B0H".

The data output from data inversion/non-inversion selector 110 and pulse position designation signal LEFT1 are latched by latches 111 and 112. The latch timings of latches 111 and 112 are respectively determined by signals LTA1 and LTB1 from timing generator 71. These signals LTA1 and LTB1 are alternately output from timing generator 71 in units of pixels.

As shown in FIG. 20D, LTA1 signals are output with respect to the first, third, and fifth pixels. Data, output from inversion/non-inversion selector 110 and which correspond to these pixels are latched in latch 111, as shown in FIG. 20E. Note that, although not shown in these timing charts, LTB1 signals are output with respect to the data corresponding to the second and fourth pixels, and the data output from inversion/non-inversion selector 110 are latched by latch 112.

The flows of signals will be described below with reference to the data latched by latch 111. Note that a description of the data latched by latch 112 will be omitted because the circuit operation associated therewith is the same as that associated with the data latched by latch 111.

The data corresponding to each pixel, which is latched by latch 111, is output to D/A converter 114 to be converted into an analog level. D/A converter 114 changes the level of an analog signal output therefrom in accordance with the magnitude of input digital data. More specifically, when data "FFH" is input to D/A converter 114, the output level (voltage) of the analog signal becomes maximum. When data "00H" is input, the output level (voltage) of the analog signal becomes minimum.

If, therefore, data "4FH" is input, the output level of the analog signal from D/A converter 114 becomes about 31%, provided that the maximum output is 100% and the minimum output is 0%. If data "B0H" is input, the output level is about 69%.

The analog signal output from D/A converter 114 is input to comparator 117. Comparator 117 compares the analog signal output from D/A converter 114 with the analog signal output from ramp generator 113, and outputs the comparison result as an H- or L-level signal.

More specifically, as shown in FIG. 20J, if the analog signal output from D/A converter 114 is larger (if the voltage is higher) than the analog signal output from ramp generator 113, comparator 117 outputs an H-level signal. In contrast to this, if the analog signal output from ramp generator 113 is larger (if the voltage is higher) than the analog signal output from D/A converter 114, comparator 117 outputs an L-level signal.

Operations of ramp generators 113 and 115 will be described below. Trigger inputs TRGA1 and TRGB1 and reset inputs RSTA1 and RSTB1 are respectively input to ramp generators 113 and 115. When trigger input TRGA1 or TRGB1 is input, the output level (voltage level) of ramp generator 113 or 115 is gradually decreased.

When reset input RSTA1 or RSTB1 is input, the output level (voltage level) of ramp generator 113 or 115 is restored to the level before the trigger input is input. That is, ramp generators 113 and 115 are charging/discharging circuits which start to discharge in response to the trigger inputs, and are charged to the initial potential in response to the reset inputs. The potential of each circuit is decreased upon discharging in proportion to the discharging time.

FIG. 20I indicates an operation of ramp generator 113. As is apparent from FIG. 20I, the output (voltage) of ramp generator 113 starts to drop at the leading edge of trigger input TRGA1. The slope of the output waveform is constant.

When result input RSTA1 shown in FIG. 20H is input, the output (voltage) of ramp generator 113 is quickly restored to the initial level. Ramp generator 113 repeats this operation at a 2-pixel period. Note that trigger inputs TRGA1 and TRGB1 and reset inputs RSTA1 and RSTB1 are signals respectively output from timing generator 71 at a 2-pixel period. Although not shown in FIGS. 20A to 20P, the phase of the operation of ramp generator 115 is shifted from that of ramp generator 113 by one pixel. More specifically, the phases of trigger inputs TRGA1 and TRGB1 are shifted from each other by one pixel, and so are the phases of reset inputs RSTA1 and RSTB1.

That is, each of ramp generators 113 and 115 is a circuit for outputting part of a triangular wave (an analog waveform exhibiting repetitive charging and discharging operations).

As shown in FIG. 20J, an output from comparator 117 corresponds to the comparison result obtained by comparing the output level of D/A converter 114 with that of ramp generator 113. Therefore, the period of time during which an output from comparator 117, obtained when data "4FH" is input to D/A converter 114, is at H level is shorter than that of an output from comparator 117, obtained when data "B0H" is input to D/A converter 114. As shown in FIG. 20K, the exclusive OR between the output from comparator 117 and signal LEFT1 latched by latch 111 corresponds to an output from XOR circuit 119. Therefore, if signal LEFT1 latched by latch 111 is at H level, the output from comparator 117 is inverted and output from XOR circuit 119.

In contrast to this, if signal LEFT1 latched by latch 111 is at L level, the output from comparator 117 is directly output from XOR circuit 119. The output from XOR circuit 119 is input to AND circuit 121 to be ANDed with signal ENA1, from timing generator 71, shown in FIG. 20L. Signal ENA1 is a rectangular wave having a 2-pixel period, which is at H level only for the period of time during which the output from XOR circuit 119 is active.

While the output, from AND circuit 121, obtained in this manner is at H level, as shown in FIG. 20M, the laser emits light. That is, the output, from AND circuit 121 with respect to the first pixel, obtained when data "4FH" is input as pulse width data PWDAT7-0 and pulse position designation signal LEFT1 is at L level, is a signal which causes the laser to emit light for about 31% of the latter half, i.e., the right side of the pixel duration.

In addition, it is apparent that the output, from AND circuit 121 with respect to the third pixel, obtained when data "4FH" is input as pulse width data PWDAT7-0 and pulse position designation signal LEFT1 is at H level, is a signal which causes the laser to emit light for about 31% of the first half, i.e., the left side of the pixel duration.

With respect to the second and fourth pixels, laser drive signals are output from AND circuit 122 upon the same circuit operation as that described above. By calculating the logical OR between the outputs from AND circuits 121 and 122, laser drive signals with respect to all the pixels can be obtained.

As described above, by inputting pulse width data PWDAT7-0 and pulse position designation signal LEFT1 to pulse generator 74, the laser-on time and the radiation timing can be arbitrarily controlled within the period of time assigned to each pixel.

Since the circuit arrangement shown in FIG. 18 includes an analog circuit, a problem is posed in terms of variations among elements. If, however, these elements are integrated into an IC, the precision of the overall circuit can be improved. Pulse generator 74 is constituted by one IC mounted on substrate 140, as shown in FIG. 18.

Toner consumption counter 75 receives pulse-width-modulated data PWDAT71-01 and pulse position signal LEFT1 to count the amount of toner consumed when printing is performed on the basis of these image signals. Controller 49 reads out the count result to control toner supply and toner density.

As described above, the pulse position of a target pixel to be printed, i.e., whether to shift the radiation timing of the laser to the left or the right within one pixel, is selected in accordance with the image data of the target pixel and of adjacent pixels located before and after the target pixel, thereby selecting whether to squeeze a laser beam to reduce its beam size or to broaden it to increase its beam size.

With this operation, high-quality printing can be performed without creating conspicuous vertical stripes or out-of-focus portions.

That is, in the formation of an image on the photosensitive drum, since exposure is performed while the beam figure of a laser beam and the radiation timing are controlled on the basis of the characteristic features of the image, the image quality can be improved.

As has been described in detail above, according to the present invention, there is provided an image forming apparatus which can prevent cracks in an image, and can smoothly express halftones, thus obtaining a high-quality image.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for forming an image on an image carrier in accordance with image data having a plurality of pixel data, said apparatus comprising:

means for generating a first light beam having a thin beam size and a second light beam having a thick beam size which is larger than the thin beam size, means for selecting one of said first light beam and said second light beam generated by said generating means in accordance with a target pixel density defined by image data of a target pixel and an adjacent pixel density defined by image data of pixels adjacent to the target pixel, such that a) the first light beam is selected when either one of the target pixel density and the adjacent pixel density is higher than a given reference value, or when a difference between the target pixel density and the adjacent pixel density is larger than a predetermined value, and b) the second light beam is selected when both the target pixel density and the adjacent pixel density are not higher than the given reference value and when the difference between the target pixel density and the adjacent pixel density is not larger than the predetermined value, means for changing a timing of emission of the one of the first light beam and the second light beam selected by said selecting means in accordance with the target pixel density and the adjacent pixel density, so that the one of the first light beam and the second light beam with the emission timing changed by said changing means is shifted to one of the target and adjacent pixels having a pixel density higher than the pixel density of the other, and means for directing toward the image carrier the one of said first light beam and said second light beam whose emission timing is changed by said changing means so as to form the image on the image carrier.

2. An apparatus according to claim 1, wherein said selecting means includes:

first providing means for providing a first signal designating the first beam size of said first light beam on the basis of a comparison result obtained by comparing a first reference value with an absolute value of a difference between the target pixel density defined by image data of the target pixel and an adjacent pixel density defined by image data of one of pixels adjacent to the target pixel;

second providing means for providing a second signal designating the second beam size of said second light beam on the basis of a comparison result obtained by comparing a second reference value with at least one of the target pixel density and the adjacent pixel density; and means for determining which of the first and second beam sizes is to be used for forming an electrostatic latent image on the image carrier on the basis of one of the first signal and the second signal.

3. The apparatus of claim 1, wherein said selecting means includes means for comparing a predetermined reference value with an absolute value of a difference between the target pixel density and the adjacent pixel density, so as to select the light beam having the smaller size when said difference is larger than said predetermined reference value;

said apparatus further including:

means for shifting the position of the selected light beam of said target pixel toward the adjacent pixel which has the higher density.

4. An apparatus according to claim 1, wherein said selecting means includes means for selecting one of the first and second light beams, whichever has the smaller size, when at least one of the target pixel density and the adjacent pixel density is larger than a predetermined reference value;

said apparatus further including:

means for shifting the position of the selected light beam of said target pixel toward the adjacent pixel which has the higher density.

5. An apparatus for forming an image on an image carrier in accordance with image data having a plurality of pixel data, said apparatus comprising:

means for generating a first light beam having a first beam size and a second light beam having a second beam size which differs from the first beam size, means for selecting one of said first light beam and said second light beam generated by said generating means in accordance with a target pixel density defined by image data of a target pixel and an adjacent pixel density defined by image data of pixels adjacent to the target pixel, such that a) the first light beam is selected when either one of the target pixel density and the adjacent pixel density is higher than a given reference value, or when a difference between the target pixel density and the adjacent pixel density is larger than a first predetermined value, and b) the second light beam is selected when both the target pixel density and the adjacent pixel density are not higher than the given reference value and when the difference between the target pixel density and the adjacent pixel density is not larger than the first predetermined value;

means for changing a timing of emission of the one of the first light beam and the second light beam selected by said selecting means in accordance with the target pixel density and the adjacent pixel density, so that the one of the first light beam and the second light beam with the emission timing changed by said changing means is shifted to the one of the target and adjacent pixels having a pixel density higher than a pixel density of the other;

means for directing toward the image carrier one of said first light beam and said second light beam whose emission timing is changed by said changing means so as to form the image on the image carrier;

means for increasing the size of the one of the first light beam and the second light beam directed toward the image carrier by said directing means at a portion where the pixel density of the image data is below a second predetermined value and a change in the density of the pixels is gradual; and means for decreasing the size of the one of the first light beam and the second light beam directed toward the image carrier by said directing means at a portion where the pixel density of the image data is above a third predetermined value and an abrupt change in the density of the pixels occurs, wherein said third predetermined value is greater than said second predetermined value.

6. An apparatus for forming an image on an image carrier in accordance with image data having a plurality of pixel data, said apparatus comprising:

means for generating a first light beam having a thin beam size and a second light beam having a thick beam size which is larger than the thin beam size;

means for selecting one of said first light beam and said second light beam generated by said generating means in accordance with a target pixel density defined by image data of a target pixel and an adjacent pixel density defined by image data of pixels adjacent to the target pixel, such that a) the first light beam is selected when either one of the target pixel density and the adjacent pixel density is higher than a given reference value, or when a difference between the target pixel density and the adjacent pixel density is larger than a predetermined value; and b) the second light beam is selected when both the target pixel density and the adjacent pixel density are not higher than the given reference value and when the difference between the target pixel density and the adjacent pixel density is not larger than the predetermined value;

means for changing a timing of emission of the one of the first light beam and the second light beam selected by said selecting means in accordance with the target pixel density and the adjacent pixel density, so that the one of the first light beam and the second light beam with the emission timing changed by said changing means is shifted to one of the target and adjacent pixels having a pixel density higher than a pixel density of the other; and means for scanning the one of the first light beam and the second light beam directed toward the image carrier with said thin beam size, when neither one of the target pixel density and the adjacent pixel density is higher than said given reference value or when the difference between the target pixel density and the adjacent pixel density is larger than the predetermined value.

7. The apparatus of claim 6, further comprising:

means for controlling the selecting means to select the light beam with the thin beam size for directing same toward the image carrier when a difference between the target pixel density and the adjacent pixel density exceeds a second predetermined value.

8. The apparatus of claim 7, further comprising:

means for controlling the selecting means to select the light beam with the thick beam size for directing same toward the image carrier when the pixel density of image data of either of said target and adjacent pixels is lower than the first predetermined value; and means for controlling the selecting means to select the light beam with the thick beam size for directing same toward the image carrier when the difference between the target pixel density and the adjacent pixel density is lower than the second predetermined value.

* * * * *